G. MANIERRE.
FLUID PRESSURE CUSHIONING DEVICE.
APPLICATION FILED MAY 28, 1917.
1,288,435.
Patented Dec. 17, 1918.
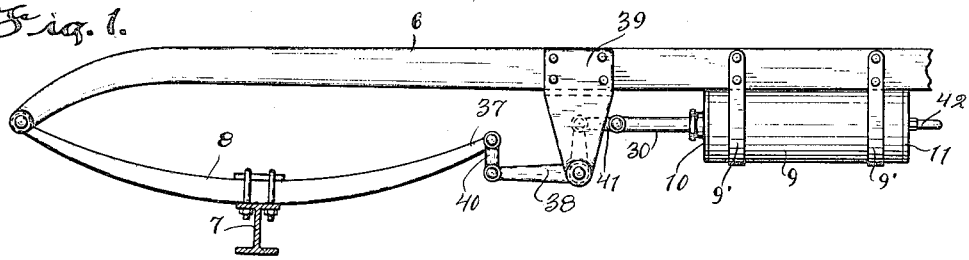
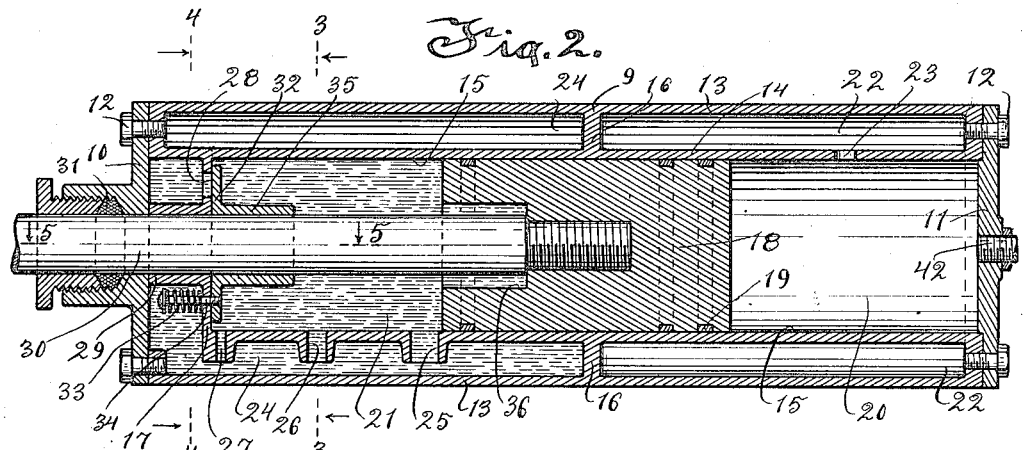
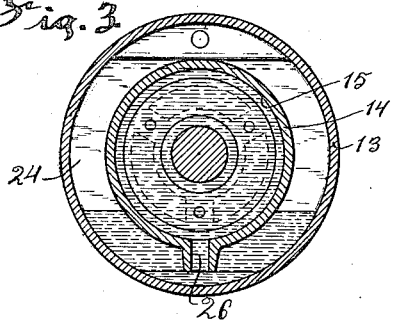
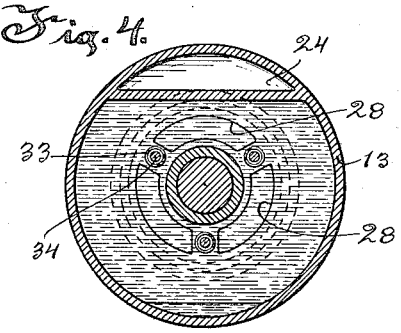
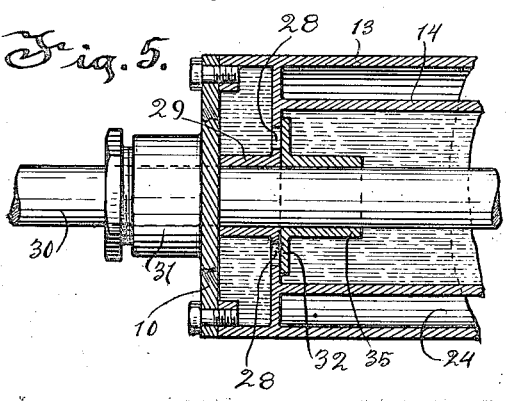
INVENTOR
George Manierre
Morsell, Keeney & French.
ATTORNEYS

UNITED STATES PATENT OFFICE.

GEORGE MANIERRE, OF MILWAUKEE, WISCONSIN.

FLUID-PRESSURE CUSHIONING DEVICE.

1,288,435.    Specification of Letters Patent.    Patented Dec. 17, 1918.

Application filed May 28, 1917. Serial No. 171,435.

*To all whom it may concern:*

Be it known that I, GEORGE MANIERRE, a citizen of the United States, and resident of Milwaukee, in the county of Milwaukee and State of Wisconsin, have invented new and useful Improvements in Fluid - Pressure Cushioning Devices, of which the following is a description, reference being had to the accompanying drawings, which are a part of this specification.

The invention relates to vehicle suspensions.

The invention is more particularly designed to provide means for suspending a vehicle upon a fluid pressure medium thereby eliminating the use of the customary springs and their attendant disadvantages.

In the use of ordinary suspension leaf springs upon vehicles, particularly automobiles, the shocks and jars are injurious not only to the vehicle and the springs but to the occupants of the car. Due to the fact that no successful and expeditious means can be used to lubricate the springs it is constantly necessary to take the springs apart to lubricate them which of course is the subject of considerable time, expense and annoyance for if the springs are not properly lubricated their action will not be smooth and they will rapidly deteriorate. Furthermore, severe jolts which may occur either on the downward or upward movements of the springs will rupture them. In the present device as previously stated the springs are entirely done away with and a device employing fluid under pressure is used in the place, said device not only absorbing the shocks on the downward movement of the vehicle but also snubbing the shock on the upward movement of the vehicle.

The invention further consists in the several features hereinafter set forth and more particularly defined by claims at the conclusion hereof.

In the drawings:

Figure 1 is a side elevation view of the device embodying the invention showing it applied to a vehicle, only a portion of the vehicle being shown;

Fig. 2 is a vertical section through the cylinder of the device;

Fig. 3 is a section taken on the line 3—3 of Fig. 2;

Fig. 4 is a section taken on the line 4—4 of Fig. 2;

Fig. 5 is a section taken on the line 5—5 of Fig. 2, parts being broken away.

In the drawings the numeral 6 represents a portion of the usual side bar of the upper frame of a vehicle, 7 the front I-beam axle, and 8 a solid metal elliptic member secured to the axle 7 and pivotally secured to the front end of the side bar. This member 8 is not a spring but is operatively connected to the suspension device hereinafter described. Only one of these suspension devices is shown and described but it will be understood that a suspension device is employed at the front and rear ends of each of the side bars.

Each suspension device consists of a cylinder 9, secured to the side bar 6 of the vehicle by straps 9' and closed at its ends by caps 10 and 11 secured to the walls of the cylinder by bolts 12. The cylinder 9 has an outer wall 13, an inner wall 14 forming a bore 15 and cross walls 16 and 17. A piston 18, carrying packing rings 19, is slidably mounted in the bore 15 and divides it into two compartments 20 and 21. The space between the cross wall 16 and the inner and outer walls 13 and 14 forms an annular compartment 22 communicating with the compartment 20 through a by-pass or port 23 disposed a predetermined distance from the cap 11. This compartment 22 is closed to the outside air. The space between the inner and outer walls of the cylinder and between the cross wall 17 and the cap 10 forms a compartment 24 which may be either closed or open to the outside air and which communicates with the compartment 21 through a series of ports or by-passes 25, 26 and 27 of successively decreasing area in the order mentioned and adapted to be successively closed in the order mentioned when the piston 18 moves toward the cap 10. In the cross wall 17 are a plurality of radially disposed openings 28. The cross wall 17 has an outwardly extending annular flange 29 forming a bearing for the piston rod 30, secured at one end to the piston and slidably mounted in a bearing and stuffing box 31 in the cap 10. Mounted on the rod 30 is a valve member 32 normally secured against the wall 17 to close the openings 28 by springs 33 interposed between the heads of bolts 34, carried by the valve, and the wall 17. The member 32 has a collar portion 35, surrounding the shaft or rod 30 and the piston 18 has an annular recess 36 therein to permit the piston being moved back to a position adjacent the cross wall 17.

With this construction we have the fluid compartment 20 which preferably contains air, the fluid compartment 22 which serves as an auxiliary air compartment to the compartment 20, the fluid compartment 21 which preferably contains oil or other suitable liquid, and the fluid compartment 24 which serves as an auxiliary liquid compartment to the compartment 21. The compartment 21 is preferably filled with oil so that the same may be used to lubricate the walls of the cylinder and the working surface of the piston.

The piston 18 is operatively connected to the supporting member 8 by means connecting the end 37 of said member with the rod 30. This means consists of a bell crank lever 38 pivotally connected intermediate its ends to a bracket 39 secured to the side bar, pivotally connected at one of its ends to a link 40 pivotally connected to the member 8 and pivotally connected at its other end to a link 41 pivotally connected to the rod 30. With this construction any relative movement between the lower supporting means for the vehicle including the axle 7 and member 8 and the body of the vehicle including the side bar 6 will impart through the link 40 a rocking movement to the lever 38 which through the link 41 will impart a reciprocal movement to the piston 18.

The chambers 20 and 22 are filled with air under pressure introduced through a suitable valve 42 of usual construction in the cap 11.

With the construction above described when the lower frame or running gear including the member 8 moves downwardly and away from the upper frame including the side bar 7, the lever 38 due to the pressure exerted by the weight of the vehicle will be oscillated or swung so as to move the piston 18 from its midposition, shown in Fig. 2, toward the cap 10 causing said piston to compress the fluid within the compartment 21 which under pressure passes out through the ports 25, 26 and 27 in the compartment 24. At first these ports permit a quick movement of the piston toward the cap 10 but during its travel in this direction it successively closes the ports 25, 26 and partially closes port 27 and these ports being of gradually decreasing area in the order mentioned the rate of flow of the oil from the compartment 21 to compartment 24 is decreased with a resulting gradual increase in pressure in the fluid remaining in the compartment 21 and the parts are so proportioned as to prevent the piston striking the valve 32 under the heaviest loads. The auxiliary fluid compartment 24 will provide a differential pressure due to the fact that it is only in communication with the chamber 21 through the ports 25, 26 and 27. The result then of this action is that on the downward movement of the lower vehicle supporting frame, the shock is gradually absorbed by the gradual increase in the pressure of the fluid within the compartment 21 which is the same action as that of a spring except that the fluid produces a smooth action. When due to shock the lower frame moves upwardly toward the upper frame, the lever 38, under the force exerted by the weight of the vehicle, will be turned to move the piston 18 from its midposition, shown in Fig. 2 toward the cap 11. While the piston is moving from midposition to a position to close the aperture 23 it is working against the air in both the compartments with the result that there will be a gradual increase in pressure in this volume of air and the auxiliary air chamber 22 will provide a differential air pressure due to the fact it is only in communication with the chamber 20 through the by-pass 23. Under these conditions these compartments 20 and 22 act as an air cushion instead of the usual spring cushioning means. Under these conditions ordinary shocks are taken care of but in the event of severe shocks the piston 18 moves beyond the aperture 23 thereby shutting off the air in auxiliary air compartment 22 with the result that the piston now acts on the volume of air in the compartment 20 between its head and the cap 11 and as the piston moves nearer to the cap 11 this volume of air is highly compressed and the pressure greatly increased with the result that there is a snubbing action produced on the upward movement of the lower supporting structure under excessive shocks. The pressure on the other side of the piston during these movements is restored by reason of the fact that on the movement of the piston toward the cap 11, the port 27 (always somewhat open) and ports 26 and 25 are successively opened and in addition the suction action produced in the chamber 21 moves the valve 32 away from its seat against the wall 17 and permits the oil to flow into the compartment 21 through the openings 28. It will thus be noted under ordinary conditions the device acts to absorb the shocks by a gradual increase in the fluid pressure against the piston but that when excessive upward shocks are encountered these shocks are snubbed by a rapid increase in fluid pressure against the piston.

It will be further noted that by the use of oil within one of the compartments in the bore 9, the working parts within the cylinder are kept properly lubricated.

I am aware that the details of construction shown and described herein are subject to some modification and change and I therefore desire it understood that such changes as come within the scope of the appended claims are within the spirit of my invention.

What I claim as my invention is:

1. The combination, with the upper supporting frame of a vehicle, of a lower frame relatively movable with respect to the upper frame, a plurality of cushioning devices interposed between and operatively connected to said frames to absorb the shocks imparted thereto, each device comprising a container connected to one of the frames, a piston working within said container and operatively connected to the other frame, said container having fluid pressure compartments on opposite sides of said piston, and auxiliary compartments respectively communicating with said compartments through ports to provide differential pressures, said piston controlling the passage of fluid through said ports.

2. A cushioning device for vehicles comprising a container having a bore therein, a piston working within the bore and forming with the container fluid pressure compartments on its opposite sides, a fluid pressure compartment communicating with the compartment in front of the piston through a port controlled by the piston, a fluid pressure compartment communicating with the compartment behind the piston through a series of ports, and means for operatively attaching the device to the frame parts of a vehicle movable relatively to each other.

3. A cushioning device for vehicles comprising a container having a bore therein, a piston working within the bore and forming with the container compartments containing fluid under pressure, a fluid pressure compartment communicating with the compartment in front of the piston through a port, a fluid pressure compartment communicating with the compartment behind the piston through a series of ports of successively decreasing area, a suction valve located between the last two named compartments, and means for operatively attaching the device between the relatively movable frame parts of a vehicle.

In testimony whereof, I affix my signature.

GEORGE MANIERRE.